United States Patent [19]

Baisch

[11] Patent Number: 5,575,432
[45] Date of Patent: Nov. 19, 1996

[54] INCREASED DRAG MECHANISM

[75] Inventor: Eric K. Baisch, Philadelphia, Pa.

[73] Assignee: Penn Fishing Tackle Manufacturing Company, Philadelphia, Pa.

[21] Appl. No.: 349,425

[22] Filed: Dec. 5, 1994

[51] Int. Cl.⁶ ........................................ A01K 89/02
[52] U.S. Cl. .............................. 242/302; 242/270
[58] Field of Search ............................ 242/270, 271, 242/303, 302, 304, 290

[56] References Cited

U.S. PATENT DOCUMENTS

| | | | |
|---|---|---|---|
| 1,547,238 | 7/1925 | Russell et al. | 242/270 |
| 3,146,966 | 9/1964 | Dunn | 242/271 |
| 3,425,644 | 2/1969 | Griste | 242/270 |
| 3,478,979 | 11/1969 | Henze | 242/270 |
| 3,966,140 | 6/1976 | Coquelet et al. | 242/271 |
| 4,516,741 | 5/1985 | Hashimoto | 242/270 |

Primary Examiner—Katherine Matecki
Attorney, Agent, or Firm—Frank J. Benasutti

[57] ABSTRACT

A fishing reel having a drag mechanism with juxtaposed surfaces relieved in those areas which are opposite the highest sections of the working cam surfaces to thereby increase the drag.

1 Claim, 2 Drawing Sheets

INCREASED DRAG MECHANISM

TECHNICAL FIELD

This invention relates to fishing reel friction drive mechanisms.

BACKGROUND ART

This invention is a particular improvement to the type of drag mechanism or brake mechanism shown in U.S. Pat. Nos. 3,478,979 issued to H. O. Henze, Nov. 18, 1969 and 3,425,644 issued to F. S. Griste, Feb. 4, 1969. Operation of the brake mechanism shown in exploded views in FIGS. 5 and 6, respectively, of those patents is clearly described in their respective specifications. Referring, for example, to the '644 patent, there is shown a rotatable cam member 68 having notches 69 in the cam surface 70 which cam surface and notches accommodate the pins 65 mounted in the follower 61. Typically the pins 65 are two in number and are located on a common diameter 180° apart.

The cam and follower come into play when the drag lever 76, 75 respectively in FIG. 1 of the two patents, is moved through an arc. Typically, this arc is more than 90" but less than 135°, and more typically an arc of 120°. Both patents indicate that by depressing stop means, such as the pins 83, 85, FIG. 5 of the '644 patent, the lever 75 can be moved further, i.e. from approximately 95 to a maximum of 120 degrees. It will be appreciated, however, that physically, there are limits to how much cam surface can be covered and 120° is considered optimum in the art.

I have disclosed in more detail the parts of the prior art as currently used in FIGS. 1 through 5, and I am using the same numbers as used in the '644 patent to describe like parts. In particular, the bearing carrier 61 retains the pin 65. The bearing carrier may be referred to as a follower/retainer; and herein after I will refer to it as the follower. The pins 65 are disposed at 180° and ride on the cam faces, or surfaces, 70. Notches 69 are provided for a rest position, known as a free spool position, in which breaking force is not being applied as shown in FIGS. 1, 2 and 3. In FIGS. 4 and 5, maximum drag has been applied, as for example by moving the lever 75 in FIG. 1 of the '644 patent to rotate the cam 68 to its fullest extent; in this case, less than 135°. From these Figures, it will be noted that the cam follower pin 65 is kept in a fixed position relative to the follower 61 by a portion of the follower which embraces the upper portion of the pin 65 when viewed as in FIGS. 2 and 4. Since the surface 70A of the cam follower retainer meets with the cam face or surface 70 of the cam 68 in the free spool position, it will be appreciated that the maximum cam rise will be the distance indicated by the arrows in FIG. 2.

From these Figures it will be appreciated that as the cam is rotated with respect to the follower, the spacing between the cam and the cam follower changes. It is this change in spacing which causes variation in the amount of drag. The prior art design limits the maximum amount of cam rise and, ultimately, the maximum drag levels.

The cam follower pin is a round, hardened piece of metal that transfers the axial force of the cam to the follower. The cam follower pin is kept in a fixed position relative to the cam follower by that portion of the follower 61 identified as a flange 61A in FIG. 4. This flange 61A must extend nearly to the mid-point of the cam follower for support; as the cam follower pin is subjected to not only vertical forces, but also to lateral forces. Thus, the prior art flange limits the maximum amount of cam rise, to the exposed height of the cam follower pin.

DISCLOSURE OF INVENTION

It is desired to increase the maximum amount of cam rise which can be achieved, in order to increase maximum drag levels. As can be seen in the prior art, increasing the cam rise, while still allowing the pins 65 to set fully into the notches 69 at the free spool position would necessitate decreasing the amount of material in the flange 61A available to retain the pin 65 to a point where there would not be enough material to retain that pin against the forces encountered in the operation of the mechanism. However, for travel of only 120° of rotation, for example, there is 60° of arc left in which to find material for a mounting to retain the pin after the maximum cam rise. I have discovered that if I was to retain the mounting, at say approximately one-half of the pin diameter, or slightly less within the practical limits of engineering design of such devices, I can increase the maximum cam rise considerably beyond that currently available by relieving the non-cam surface of the flange 61A to make room for that rise. At the same time, I can leave the cam pin retainer flange at the same pin depth for retention of the pin. In order to allow for cam rise greater than the exposed height of the follower pins, opposing cuts are made in the cam and the cam follower. The shoulder 162 of the cam follower is relieved in those areas which are opposite the highest sections of the working cam surface, while leaving the material needed to support the follower pins untouched. An opposing cut is made in the cam. The cam surface is relieved in those areas which would interfere with the portion of the follower shoulder providing support for the follower pins. Thus, the cam cut is on an unused section of the cam surface, while the cam follower clearance cut is made away from the area in which the material is needed to support the cam follower pin. The removal of the material from the cam does not affect its function, as it is taken from an area of the cam which is beyond the rotation of the cam follower pins. Thus, by making opposing clearance cuts in accordance with my invention, to both the cam and cam follower, the maximum cam rise which can be achieved is increased. The basic mechanical properties of the mechanism remain unchanged while being effective for increasing the maximum cam rise, and thus increasing the drag through the same amount of rotation as in the prior art.

DESCRIPTION OF THE PREFERRED EMBODIMENT

Figure 1:
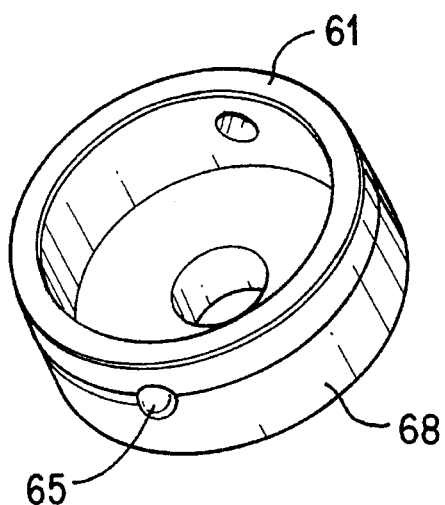
FIG. 1 is a perspective assembled view of a cam follower, cam follower pin and cam for use in a fishing reel with a friction drag, in accordance with the prior art.
Figure 2:
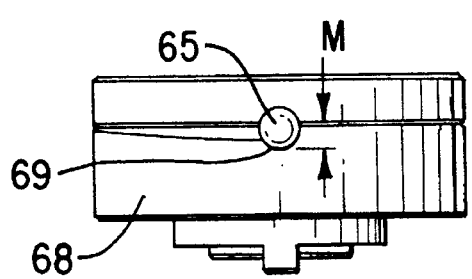
FIG. 2 is an elevation of the parts shown in FIG. 1, showing the mechanism in what is known as the "free spool" position.
Figure 3:
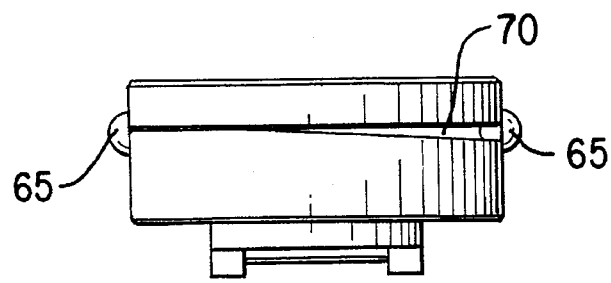
FIG. 3 is an elevation similar to FIG. 2 with the parts viewed as rotated 90° about a vertical axis.
Figure 4:
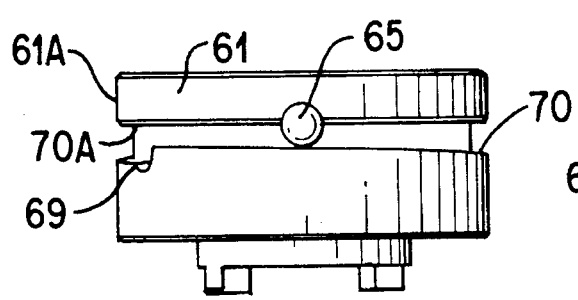
FIG. 4 is a view similar to FIG. 2, in which the cam portion of the mechanism has been rotated 120° into what is known in the prior art as the maximum drag assembly position.
Figure 5:
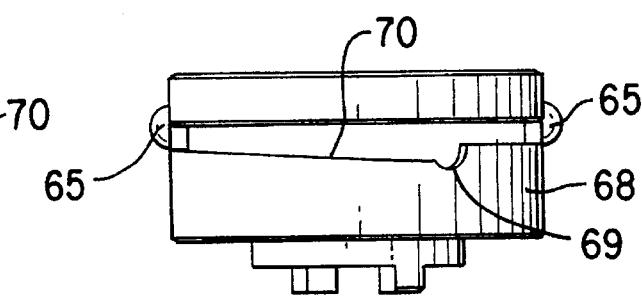
FIG. 5 is a view similar to FIG. 3, wherein the entire mechanism shown in the position in FIG. 4 is viewed rotated 90° about a vertical axis.
Figure 6:
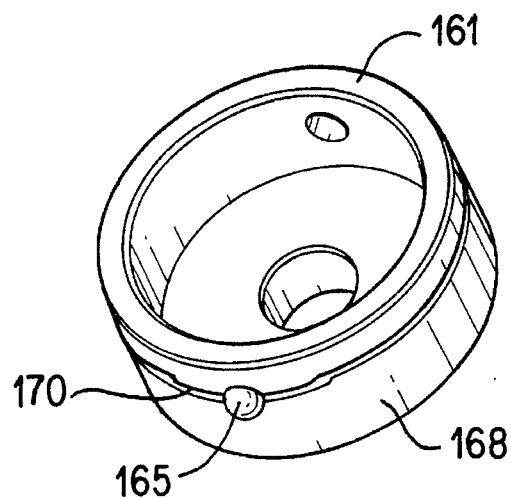
FIG. 6 is a perspective view of the cam assembly in accordance with the preferred embodiment of my invention.

Referring to FIGS. 6 through 10, my improved increased drag mechanism is shown in detail and comprises a cam 168 having a cam surface 170. The followers 165 are cylindrical pins mounted in the bearing carrier 161, and retained therein in part by the downwardly depending flange or shouldered portion 162 which terminates in a radial surface 163. As shown, the pin is retained in part within this flange portion such that the radial surface 163 engages the cylindrical surfaces of the follower pin 165 along longitudinal lines which intersect at or about planes defined by those longitudinal lines and chords which bisect the cylinder approximately just short of a central diametrical chord. In other words, if one were to slice the cylinder of the pin 165 lengthwise along its diameter and axis, the surface 163 would intersect the cylindrical sides of the cylinder along lines parallel to those intersection lines. By way illustration, I have shown in FIGS. 7 and 8 the central axial line of the pin 165 which, as will be noted from a view of those Figures, is not at the surface 163.

Figures 7, 8:
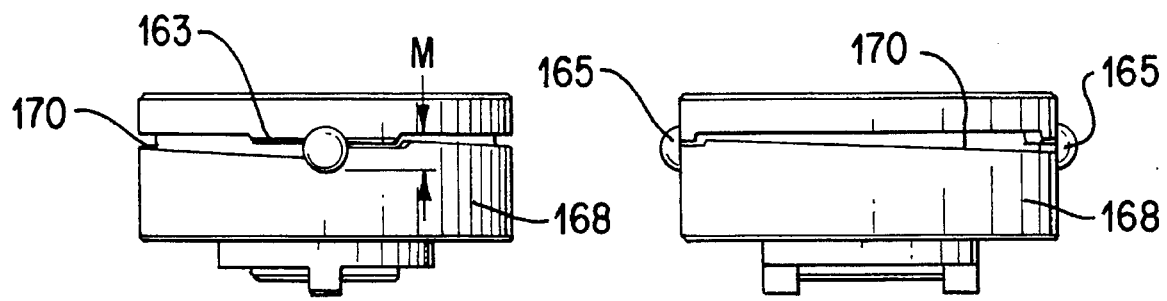
FIG. 7 is an elevation view similar to the prior art view FIG. 2 showing the parts of the cam assembly in the free spool position.
FIG. 8 is an elevation of the parts in the free spool position wherein the entire cam assembly is viewed rotated 90° about the vertical axis from the position shown in FIG. 8.
Figures 9, 10:
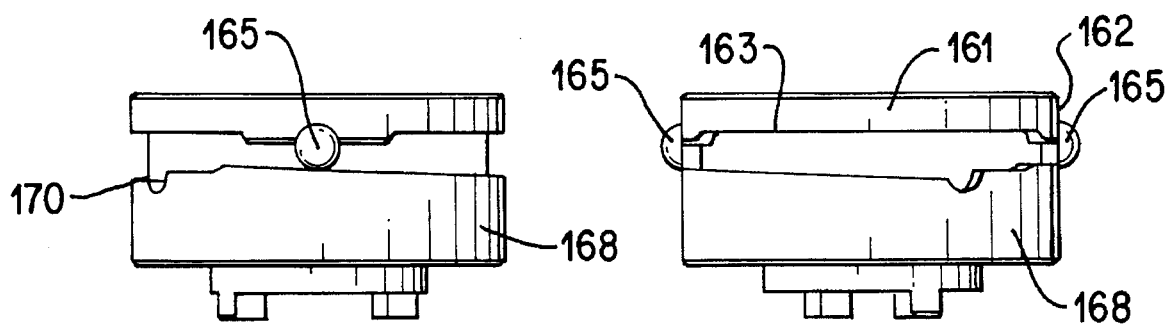
FIG. 9 is a view similar to FIG. 7, wherein the cam portion of the assembly has been rotated to its maximum drag position.
FIG. 10 is a view of the parts in their assembled position as in FIG. 9, wherein the assembly is viewed rotated 90° about a vertical axis in order to view those parts from that position.

It will be further noted from FIGS. 7 and 8 that the cam surface 170 at its maximum vertical position designated M is above that center line. Thus, the maximum cam rise would be measured from the lower-most surface of the pin 165 to the maximum cam rise M. In the position shown in FIGS. 7 and 8, the cam is at its lowest position. If the cam 168 were to be rotated 120°, it would be in the position shown in FIG. 9. In that position the follower has been moved axially. While the cam surface as drawn continues to rise, this section of the cam is not used, as it is beyond the 120 degrees of rotation which the reel can physically achieve.

Beyond this maximum position, I have relieved the cam surface 170 back to a position wherein it can accommodate the portion of the flange 162 which retains the pin 165. In this manner, I am able to retain the pin against the forces necessary for operation.

It will be appreciated that the actual amount of relief necessary will be dependent upon the actual amount of material necessary to maintain the pin, and that the relieved portion will be in that portion of the surfaces not being used for purposes of increasing cam rise.

OPERATION

In operation, as the drag lever, such as the lever 75 of the '644 patent is moved from the free spool position to the maximum drag position, the cam 168 (FIG. 6) rotates, thereby moving the follower 161 axially, by means of the pins 165 following along the surface 170 of the cam 168, thereby varying the drag to a maximum position, which is preset by the mechanism (not described, but known in the art as shown in the patents referenced above).

I claim:

1. An improved cam means for use in a fishing reel of the type having a friction drag means, to increase the range of the drag imparted by the operation of said drag means; which drag means includes a substantially cylindrical cam rotatable about its cylindrical axis, said cam having a cam follower surface thereon which rises axially, said drag means further having a follower means comprising a pin retained by and protruding from a radially extending surface of a follower, said pin engaging said follower surface on said cam and positioned to move axially in response to rotation of the cam about its axis, following the axial position of the cam surface, whereby the drag imparted by said drag means is adjusted; the improvement comprising:

said follower having a shouldered portion extending axially from said radially extending surface toward said cam surface, said shouldered portion retaining said pin; and said cam surface having a portion thereof configured to retain a portion of said pin and, thereafter, rising axially to a portion of said cam surface which is relieved axially to accommodate said shouldered portion of said follower, so that a substantial portion of said shouldered portion fits substantially within said relieved portion of said cam surface.

* * * * *